United States Patent
Stickle et al.

(10) Patent No.: US 10,362,053 B1
(45) Date of Patent: Jul. 23, 2019

(54) COMPUTER SECURITY THREAT SHARING

(71) Applicant: Amazon Technologies, Inc., Seattle, WA (US)

(72) Inventors: Thomas Charles Stickle, Saint James, NY (US); Carl Jay Moses, Nokesville, VA (US); Ryan Christopher Holland, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 15/139,281

(22) Filed: Apr. 26, 2016

Related U.S. Application Data

(63) Continuation of application No. 14/293,742, filed on Jun. 2, 2014, now Pat. No. 9,325,732.

(51) Int. Cl.
*H04L 29/06* (2006.01)

(52) U.S. Cl.
CPC ................ *H04L 63/1441* (2013.01)

(58) Field of Classification Search
CPC .................................................. H04L 63/1441
See application file for complete search history.

(56) References Cited

U.S. PATENT DOCUMENTS

| | | | | |
|---|---|---|---|---|
| 5,561,790 A * | 10/1996 | Fusaro | ............ | G06F 17/509 703/26 |
| 5,694,590 A * | 12/1997 | Thuraisingham | ....... | G06F 21/55 |
| 6,167,521 A * | 12/2000 | Smith | .............. | G06F 21/33 380/286 |
| 6,922,696 B1 * | 7/2005 | Lincoln | ............... | G06F 21/556 |
| 7,013,395 B1 * | 3/2006 | Swiler | ................ | H04L 63/1433 713/151 |
| 7,475,351 B1 * | 1/2009 | Johnson | ............. | H04L 41/0873 715/736 |
| 10,084,819 B1 * | 9/2018 | Nogin | ................. | H04L 63/20 |
| 2002/0174367 A1 * | 11/2002 | Kimmel | ............... | G08B 13/19 726/4 |
| 2003/0130821 A1 * | 7/2003 | Anslow | ............. | H04L 41/12 702/186 |
| 2005/0204131 A1 * | 9/2005 | Kovarik, Jr. | ........ | G06F 21/6227 713/166 |
| 2006/0212941 A1 * | 9/2006 | Bronnikov | ............ | G06F 21/577 726/24 |
| 2010/0082977 A1 * | 4/2010 | Boyle | ................. | H04L 63/0815 713/158 |
| 2010/0251329 A1 * | 9/2010 | Wei | ..................... | H04L 63/1408 726/1 |
| 2012/0209886 A1 * | 8/2012 | Henderson | ........ | G06F 17/30557 707/798 |

(Continued)

Primary Examiner — John B King
(74) Attorney, Agent, or Firm — Thorpe North & Western, LLP.

(57) ABSTRACT

A computer security threat sharing technology is described. A computer security threat is recognized at an organization. A partner network graph is queried for security nodes connected to a first security node representing the organization. The first security node is connected to at least a second security node representing a trusted security partner of the organization. The second security node is associated with identification information. The computer security threat recognized by the organization is communicated to the trusted security partner using the identification information associated with the second security node.

20 Claims, 8 Drawing Sheets

(56) References Cited

U.S. PATENT DOCUMENTS

| | | | | |
|---|---|---|---|---|
| 2013/0091539 A1* | 4/2013 | Khurana | ............... | G06F 21/552 |
| | | | | 726/1 |
| 2014/0143863 A1* | 5/2014 | Deb | ..................... | G06F 21/552 |
| | | | | 726/22 |
| 2014/0172749 A1* | 6/2014 | Posch | .................... | G06Q 40/02 |
| | | | | 705/36 R |
| 2015/0188941 A1* | 7/2015 | Boshmaf | ............. | H04L 63/1441 |
| | | | | 726/22 |

\* cited by examiner

COMPUTER SECURITY THREAT SHARING

This application is a Continuation of U.S. patent application Ser. No. 14/293,742, filed on Jun. 2, 2014, which is incorporated herein by reference.

BACKGROUND

Computer security infrastructure may include mechanisms by which computer equipment, information and services are protected from unintended or unauthorized access, changes or destruction. In an attempt to shield access to internal network services and block computer security attacks, network firewalls and similar preventative measures are often deployed at computer network borders where more private computer networks connect to more public computer networks such as the Internet. Intrusion detection systems (IDSs) are also sometimes deployed to detect computer network attacks in progress and assist in post-attack forensics. In another layer of security, a corporate computer server may require authentication credentials before allowing access to the server. A further aspect of computer security may be physical security of computer equipment from unauthorized persons. With the growing interconnectedness of computing systems and the frequent security breaches that have occurred in the past, there is an increased need for providing effective computer security.

DETAILED DESCRIPTION

A computer security threat sharing technology is described. In one example, the technology may be used to send and receive information about computer security threats with a connection in a social network graph. In addition to mitigating computer security threats through increased communication of computer security threats, the technology may assist organizations in managing sharing of information regarding computer security threats in such a way that is consistent with the organization's policies.

In some scenarios sharing computer security threat information may be detrimental to an organization's computer security. For example, sharing computer security threat information with the attacker may cause further vulnerabilities to be discovered by the attacker. Additionally, shared information may allow the attacker to know what type of information is being gathered for post-attack forensics. Therefore, the technology may include identifying trusted security partners with whom an organization is comfortable sharing computer security threat information with once a computer security threat has been recognized and these trusted security partners may be formed into a partner network for the organization.

For example, a particular Internet protocol (IP) address may attempt to brute force crack a password for one or several users of a site. A security appliance at a company may recognize repeated authentication failures from a single IP address and may then notify other organizations connected to the company through a partner network graph. To do so, the partner network graph may be queried for identification information such as a server IP address to forward the computer security threat to and authentication information for proving who the information is from, for instance. In this example, the computer security threat may include information such as the IP address of the attacker and the type of attack being employed. The technology may be implemented as a trusted security service which is centralized. Alternatively, the technology may be implemented in a peer-to-peer environment where the partner network graph, messaging systems, partnering logic and related services are distributed or replicated across the registered clients or peers.

Figure 1:
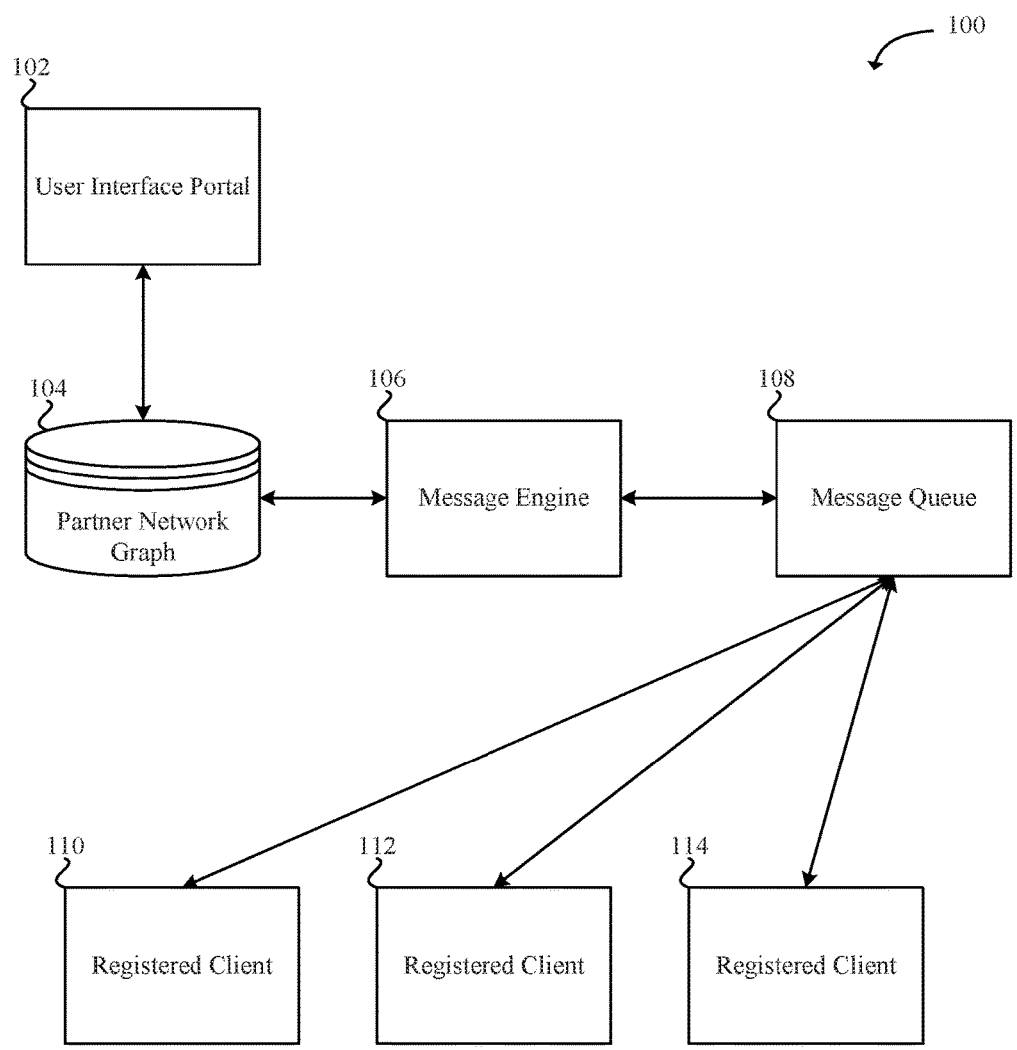
FIG. 1 illustrates an example of a system for sharing computer security threats.

To more clearly describe the technology, examples are now provided with reference to the figures. Accordingly, FIG. 1 illustrates an example of a system 100 for sharing computer security threats. The system 100 includes a user interface portal 102. The user interface portal may allow users, such as information technology (IT) personnel of an organization to connect the organization to other trusted security partners or partner organizations in a partner network graph. The type of connections created in the partner network graph may define what types of computer security threats discovered by the organization are shared with other organizations. Thus, the user interface portal allows trusted partners of an organization to be identified. Once these partners are identified, they may be stored in a partner network graph data store 104. An example of the user interface portal 102 is discussed in further detail with reference to FIG. 2 below.

The partner network graph data store 104 may be a partner network graph data structure with an edge between a first security node and a second security node. An edge may represent a trusted relationship between two nodes or the organizations represented by those nodes. As an example, the first security node may represent an organization, while the second security node may represent a trusted security partner of the organization. In addition, any number of nodes and edges may be part of the partner network graph representing an arbitrarily large number of trusted security partner relationships between organizations.

The edges in the network graph data store 104 may include related information such as edge weight or edge direction. Edge weight may indicate a security tier of a trusted security partner. As an example, a trusted security partner that may have a heavily weighted edge may indicate that the trusted security partner should receive a higher notification priority when a computer security threat is detected by the organization. Additionally, a higher tier may allow the trusted security partner to receive a more substantial portion of the computer security threats detected by the organization. An edge direction may also indicate that security information may flow in two directions between trusted security partners or in just one direction.

A security tier for a trusted security may be defined by a number of factors and the security tier may influence edge weightings. Some factors for creating security tiers (e.g. relationship tiers) or weightings may include entity size, entity reputation, entity security reputation, historical security threat identification accuracy, volume accurate security threat information provided, etc. Entities in a higher tier or with a higher weighting may have security threat information from that entity be deemed to be more accurate. Entities with a lower security rating but which have provided accurate security threat information in the past may have their entities' security threat information accepted but treated with additional checks or human validation operations. Entities with a low level of trust may have their information checked by a human before the security threat information is propagated or entities with a low level of trust may be entitled to just receive security threat information. In addition, entities may have their security tier or weighting level increase as the information received from the entity is proved to be valid over time. Further, if trust has been established with another trusted security partner, then that trust may be transferred to other entities in the network as trusted security partnerships are created.

The nodes in the partner network graph data store 104 may also be associated with related information such as threat notification information, an organization name, a contact person, certifications and other information that may be usefully related to nodes in a partner network graph. For instance, identification information may be useful in communicating and transmitting computer security threats to trusted security partners. Identification information may include data such as IP addresses, domain names, uniform resource location (URL), email addresses, phone numbers, instant messaging addresses and other means to establish contact with trusted security partners. In addition to identification information, threat notification information may also include other types of data. As a few examples, threat notification information may include: electronic formatting information, what types of computer security threats may be requested by a trusted security partner and accounting information to ensure that the organization and the trusted security partner are both benefiting from the security partnership. As an alternative, costs may be accrued based on how many computer security threats are detected and reported to one another.

One portion of the technology is recognizing a computer security threat at an organization. For example, a registered client 110-114 may be a security device that may recognize a computer security threat. The registered client may be an organization that is registered with the system for sharing security threats or a registered client may be a physical security device or security server instance that is controlled by the client organization. The registered client 110 may be a security device that includes a firewall (e.g., a web application firewall (WAF)) or an intrusion detection system (IDS), as examples. After recognition, the computer security threat may be communicated to trusted security partners as desired. In communicating the threat, an organization that has recognized a computer security threat may cause a query to be performed on the partner network graph database 104. Upon receiving notification of a threat from the registered client 110, a messaging engine 106 may query the partner network graph data store 104 for security nodes connected to a security node representing an organization that is a trusted security partner. As an example, a security node identifying a trusted security partner of the organization may be returned by the query, and the security clearance of that partner may also be provided. Additionally, threat notification information associated with the security node identifying the trusted security partner may be retrieved with the query and the computer security threat may be communicated to trusted security partners (e.g. registered clients connected to the organization in the partner network graph) through the messaging queue 108. The combination of the partner network graph 104, user interface portal 102, the message engine 106, and the message queue 108 may be a centralized system that forms a trusted computing service for the registered clients 110-114. Alternatively, the functions described by these modules may executed or be hosted in a peer-to-peer fashion with each registered client 110-114 being a peer in the network. In the peer scenario, a copy of the system components or a portion of the components may be located with each peer.

As another example, the registered clients 110 and 112 may be a device managed by trusted security partners and may therefore receive the computer security threat notification. On the other hand, the registered client 114 may not be a trusted security device of the organization that identified the computer security threat, and may therefore, not receive notification of the computer security threat from the messaging queue 108. Similarly, the registered client 114 may not have a high enough security rating to receive certain types of security threat notifications being propagated through the partner network graph.

In a further example, the registered clients 110, 112, 114 may be security appliances. Security appliances may be designed to protect an application or group of applications that may be accessed by proxy requests through the appliance. For example, a web application firewall (WAF) appliance may be able to detect that a particular rogue source IP address is attempting to attack an authentication scheme over time. Thus, the technology may use partner network graphs to enable groups of organizations to rapidly share computer security threats across enterprise boundaries. As an example, a WAF appliance at a first company may detect an authentication threat and may communicate the computer security threat using the system 100. Included in the computer security threat may be a source IP address, a source software package or a threat type. Other companies and organizations that may be connected to the originating organization within the partner network graph data store 104 may use the notification as input to their own security infrastructure.

The technology may leverage partner network graphs as a way to define a community that is able to share computer security threats. The community may allow participants to interact with trusted entities (e.g., in the form of companies) with which they may have existing business relationships. As another example, organizations with similar security postures or organizations that may be likely to face similar computer security threats may employ the technology to help enhance computer security at their respective organizations. Thus, the user interface portal 102 may allow users to define their social graph and partner with other companies, organizations, households or people for the purpose of sharing computer security data. Security devices may then be able to invoke an application programming interface (API) to report a computer security threat and/or ways to address the computer security threat.

In one example, the user interface portal 102 may be a site or a group of pages on a site that may be accessed through a browser. As discussed, the technology may include reporting methods to help address a computer security threat. In some setups, a threat neutralization strategy may be developed and output to for review by a person. The person may then provide approval through a user interface (UI) to apply the threat neutralization strategy. The UI may be accessed in the same manner as the user interface portal 102 discussed above, or a separate UI may be available to receive threat neutralization approvals. For example, a site may provide hypertext markup language (HTML) pages over a hypertext transfer protocol (HTTP) connection to implement the UI. Browser sessions may be used to allow a user to authenticate to the site. The UI may be able to receive threat neutralizations approvals. Once approval of the threat neutralization strategy has been received from a person through the UI, the threat neutralization strategy may be applied. For example, a source IP address may be blocked or a particular sequence of network packets may be dropped based on the threat neutralization strategy by a network appliance.

Figure 2:
FIG. 2 illustrates an example of a user interface for managing connections of an organization in a partner network.

FIG. 2 illustrates an example of a user interface (UI) 200 for managing connections of an organization in a partner network. The user interface 200 may include a page 202 rendered in a browser. The left side of the page 202 may include a list of partner organizations 204 for a logged in user or organization. The upper right portion of the page 202 may include detailed information 206 for an organization selected from the list of partner organizations 204 on the left side of the page 202. Further, the portion of the page 202 just below the detailed information 206 may be a second list of organizations 208. The second list of organizations 208 may include a partner network graph connection of the organization selected from the list of organizations 204 on the left side of the page 202. In this way, the logged in user or organization may have a partner organization in common with the organizations found in the second list of organizations 208, namely the 'ABC Telecom' company specified in the detailed information 206 area of the page 202.

In the second list of organizations 208, connection requests may be made to connect the logged in user or organization with other nodes in the partner network graph. For example, the second list of organizations 208 may include common connections between the logged in user and ABC Telecom (e.g. 'Cogswell Cogs', 'Spacely Sprockets'). Uncommon connections, or organizations connected to ABC Telecom but not connected to the logged in user may also be listed with a clickable area to request connection with an organization.

The technology may also include partnership recommendations. For example, a UI may be used to recommend trusted security partnerships for a security node in the partner network graph based in part on shared connections of a first security node and a second security node. In another example configuration, the connection between the first security node and the second security node may be made automatically. For instance, the first security node and the second security node may be certified by a shared security authority in the partner network graph. This may allow users of the technology to provide settings to allow automatic connections based on particular types of security postures as evidenced by certification by a security auditor or specific defined security levels, for example.

As discussed above, once the partner network graph has been setup using the UI 200, devices or IT personnel at an organization may recognize a computer security threat at the organization and communicate the computer threat recognized by the organization to one or more trusted security partners by querying the partner network graph for security nodes connected to a first security node representing the organization. As an example, the first security node may be connected to a second security node representing a trusted security partner of the organization. The second security node may be associated with identification information that may be used to communicate the computer security threat to the trusted security partner.

Figure 3:
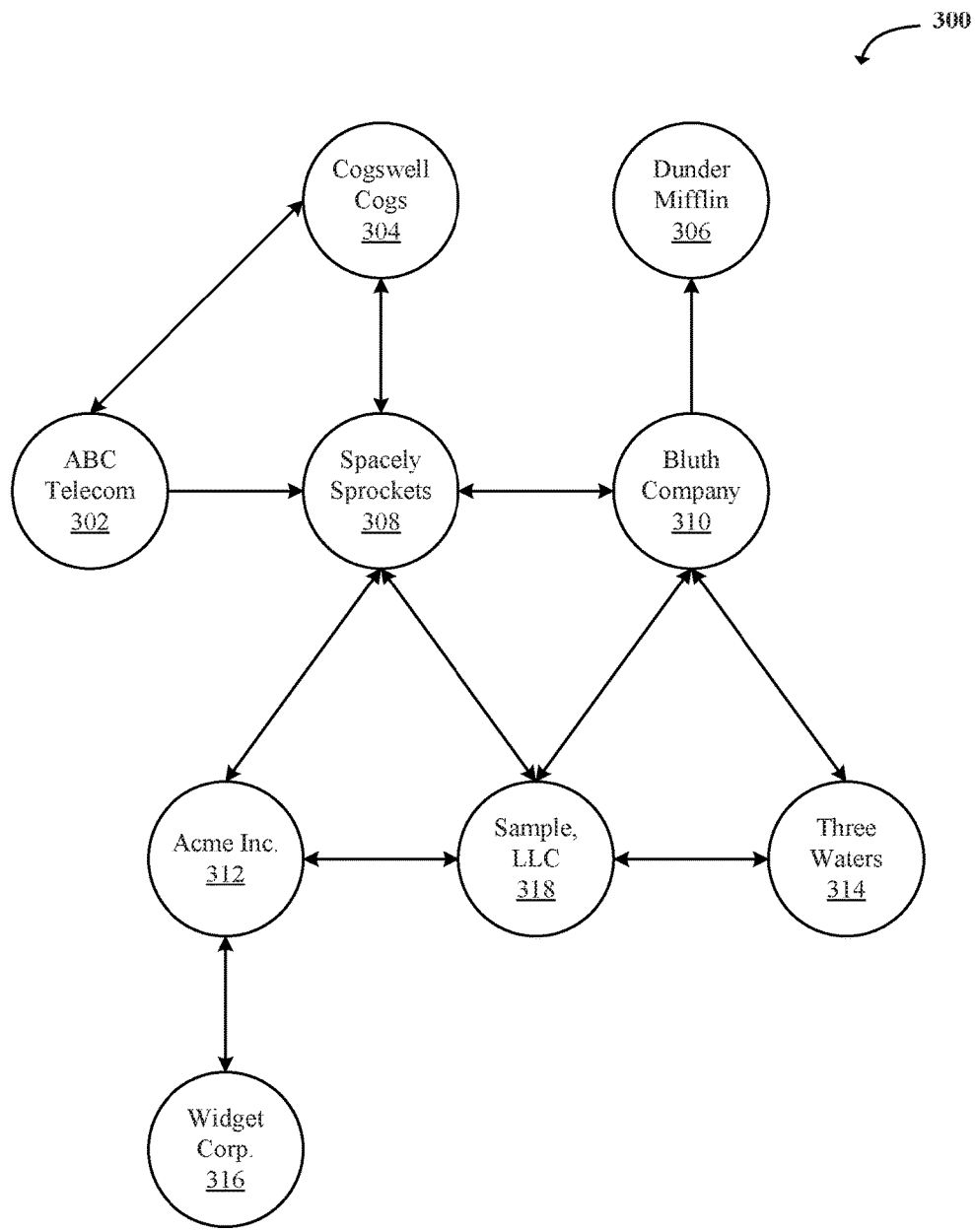
FIG. 3 illustrates an example of a partner network graph.

FIG. 3 illustrates an example of a partner network graph 300 for sharing computer security threats. The partner network graph 300 is a data structure that may be created, stored and modified using a data store such as a relational or object oriented database. Each node 302, 304, 306, 308, 310, 312, 314, 316, 318 in the partner network graph 300 may include a list of nodes that the node is connected to. For example, the 'Bluth Company' node 310 may have a list of connected nodes that includes the 'Dunder Mifflin' node 306, the Spacely Sprockets' node 308, the 'Three Waters' node 314 and the 'Sample LLC' node 318. As can be seen in the figure, each node 302, 304, 306, 308, 310, 312, 314, 316, 318 may represent an organization or trusted security partner. Additionally, each node 302, 304, 306, 308, 310, 312, 314, 316, 318 may include auxiliary information such as identification information, certifications, descriptions, defined security postures, defined security levels, encryption keys for protected communications, pictures of the organization and other useful information that may be associated with organizations and/or computer security. As an example, a node may include identification information such as an Internet protocol (IP) address, an Internet domain name, an email address, a short message service (SMS) number, telephone number, or a uniform resource locator (URL).

The edges in the partner network graph 300 may also include or be associated with auxiliary information. For example, the partner network graph 300 may include directed edges or undirected edges to form directed or undirected graphs. This information may be stored alongside edge information or may be included with information stored alongside nodes in the partner network graph 300. As another example, edges in the partner network graph 300 may be weighted. The weighting of the edges in the partner network graph 300 may indicate a security tier that is formed between two separate nodes representing two separate organizations. As an example, based in part on a security tier associated with a security node a first security node may determine whether to communicate a particular computer security threat to a trusted security partner. Organizations that have more similar security postures, may for example, be more inclined to share more computer security threat information, whereas organizations with very different security postures may desire to have a more limited arrangement in sharing computer security threats. The weighting of the edges may be represented as numbers, alphabetic values or with a classification name, as a few examples.

As another example, a higher tiered trusted security partner may be messaged about the computer security threat more quickly or with a less delay than a lower tiered trusted security partner. In this way, the technology may allow preferential treatment of trusted security partners based on the partner network graph. As a further example, a higher tiered trusted security partner may be messaged about more types of computer security threats than a lower tiered trusted security partner.

The partner network graph 300 may also enable automatic forwarding of computer threat information to trusted security partners in the partner network graph 300 without human intervention. For example, if a security threat is detected by one trusted security partner, the security threat information can be propagated through the entire network to trusted security partners in the appropriate tier or with the appropriate weighting. The propagation of security threat information may take place in a short period of time because the partner network graph 300 with trusted security partners is already in place when the security threat occurs.

Figure 4:
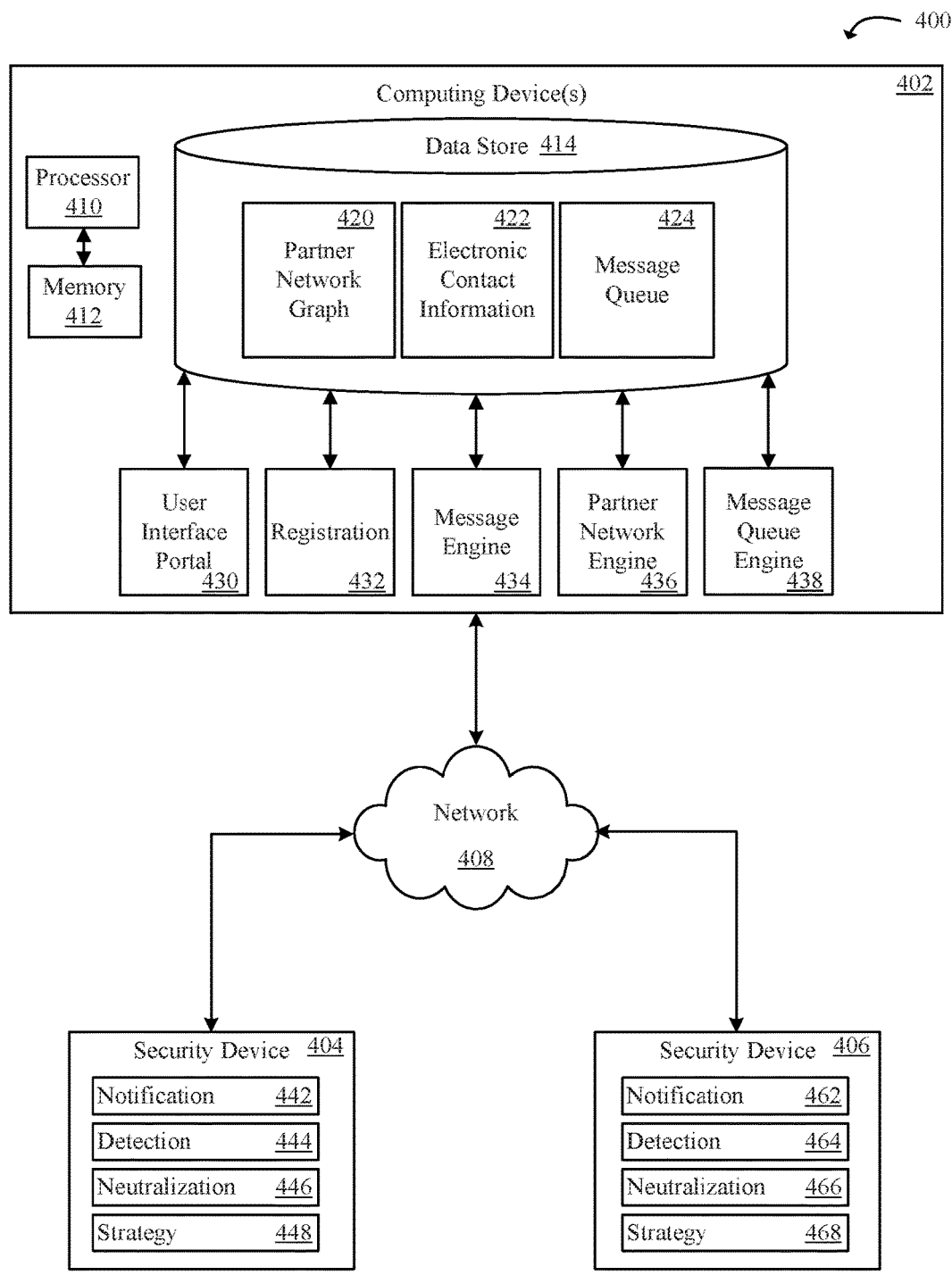
FIG. 4 is a component block diagram illustrating an example of a computer security threat sharing system.

FIG. 4 is a component block diagram illustrating an example of a computer security threat sharing system 400. The computer security threat sharing system 400 may be used to implement the functionality heretofore described with reference to FIGS. 1-3 or other exemplary functionality discussed below, including functionality described with reference to FIGS. 5-9. The computer security threat sharing system 400 may include one or more computing devices 402 and may include two security devices 404, 406. The computing device 402 may be a server used to receive and transmit computer security threats over the network 408.

The computing device 402 may include a data store 414 having various information stored therein. Additionally, the computing device 402 may include various modules such as a user interface portal module 430, a registration module 432, a message engine module 434, a partner network engine module 436, a message queue engine module 438 and other modules to implement functionality described herein. More specifically, the computing device 410 may host a trusted security service that is formed from the data store and the functional modules 430-438 instantiated on the computing device 402. The trusted security service may be a trusted computing service that is centralized.

The user interface portal module 430 may allow users, such as information technology (IT) personnel of an organization, to connect an organization to other organizations (i.e., trusted security partners) in a partner network graph. These connections in the partner network graph may define what types of computer security threats discovered by the organization are shared with other partner organizations. Thus, the user interface portal module 430 may allow trusted security partners of an organization to be identified. Once these trusted security partners are identified, they may be stored in a partner network graph data store 420. Thus, the registration module 432 may register trusted security partnerships between security nodes in the partner network graph as entered in through the user interface portal module 430.

The centralized trusted security service that is located on the computing device(s) 402 may also be accessed using API calls, procedure calls or other network commands that may be made to the trusted security service according to different technologies, including, but not limited to, Representational State Transfer (REST) technology or Simple Object Access Protocol (SOAP) technology. REST is an architectural style for distributed hypermedia systems. A RESTful API (which may also be referred to as a RESTful web service) is a web service API implemented using HTTP and REST technology. SOAP is a protocol for exchanging information in the context of Web-based services. The trusted security service can provide services using an underlying trusted security service system that is accessible and configurable via functional calls to the trusted security service.

The message engine module 434 may receive a message about a computer security threat from a computer associated with a security node in the partner network graph data store 420. In addition, the partner network engine module 436 may maintain a partner network graph having security nodes including identification information.

The message engine module may query the partner network graph data store 420 for security nodes connected to a security node representing the organization. As an example, a security node identifying a trusted security partner of the organization may be returned by the query. Additionally, identification information associated with the security node identifying the trusted security partner may be retrieved with the query and the computer security threat may be communicated (i.e., directly sent electronically) to the trusted security partner through the message queue engine module 438. Identification information may be stored in the identification information data store 422 in one configuration (as compared to being stored directly with a node of the partner network graph). Further, the message queue engine module 438 may message trusted security partners associated with the security node in the partner network graph of the computer security threat using the message queue data store 424 to queue up messages as the message queue engine module 438 makes contact therewith.

The functionality of the computer security threat sharing system 400, and other functionality described herein, may be embodied on a non-transitory machine readable storage medium having a plurality of instructions adapted to be executed to implement the aforementioned functionality.

The network 408 may include any useful computing network, including an intranet, the Internet, a local area network (LAN), a wide area network (WAN), a wireless data network, or any other such network or combination thereof, and may utilize a variety of protocols for transmission thereon, including for example, Internet Protocol (IP), the transmission control protocol (TCP), user datagram protocol (UDP) and other networking protocols. Components utilized for such a system may depend at least in part upon the type of network and/or environment selected. Communication over the network may be enabled by wired or wireless connections and combinations thereof.

The security devices 404, 406 may be examples of network security devices running software with notification modules 442, 462 for interacting with the services provided by the computing device 402. Detection modules 444, 464 may detect security threats, while the neutralization modules 446, 466 may apply neutralization strategies to mitigate particular computer security threats. To that end the strategy modules 448, 468 may programmatically generate neutralization strategies. As example, machine learning (ML) techniques may be employed to generate neutralization strategies. In another example, the strategy module 448, 468 may interface with IT personnel to arrive at an effective neutralization strategy based on the IT personnel's input. Similar functionality may be included in the computing device 402 such that the computer security threat may be output for review by a person. Thus, a threat neutralization strategy may be received from the person or user in response to the computer security threat through a user interface (UI) whether that UI interfaces with the security devices 404, 406 or the computer device 402.

The computing device 402 may comprise, for example, a server computer or any other system providing computing capability. Alternatively, a plurality of computing devices 402 may be employed that are arranged, for example, in one or more server banks or computer banks or other arrangements. For purposes of convenience, the computing device 402 may be referred to in the singular, but it is understood that a plurality of computing devices 402 may be employed in various arrangements as described above.

Various processes and/or other functionality, as discussed herein, may be executed in the computer security threat sharing system 400 according to various examples. The computing device 402, may for example, provide some central server processing services while the security devices 404 and 406 may provide local processing services and interface processing services to interface with the services of the computing device 402. Therefore, it is envisioned that processing services, as discussed herein, may be centrally hosted functionality or a service application that may receive requests and provide output to other services or customer devices. Thus in some examples, the functionality of the computing device 402 may be included in the security devices 404 and/or 406.

For example, services may be considered on-demand computing that is hosted in a server, cloud, grid, or cluster computing system. An application program interface (API) may be provided for each service to enable a second service to send requests to and receive output from the first service. Such APIs may also allow third parties to interface with the service and make requests and receive output from the service. Like the various processing capabilities on the security devices 404 and 406, a processor 410 may provide processing instructions by communicating with a memory 412 on the computing device 402. That is, the memory device may include instructions operable to be executed by the processor to perform a set of actions. The processor 410 and/or the memory 412 may directly or indirectly communicate with a data store 414.

Various data may be stored in the data store 414 that is accessible to the computing device 402. The term "data store" may refer to any device or combination of devices capable of storing, accessing, organizing and/or retrieving data, which may include any combination and number of data servers, relational databases, object oriented databases, cloud storage systems, data storage devices, data warehouses, flat files and data storage configuration in any centralized, distributed, or clustered environment. The storage system components of the data store 414 may include storage systems such as a SAN (Storage Area Network), cloud storage network, volatile or non-volatile RAM, optical media, or hard-drive type media. The data store 414 may be representative of a plurality of data stores 414.

Figure 5:
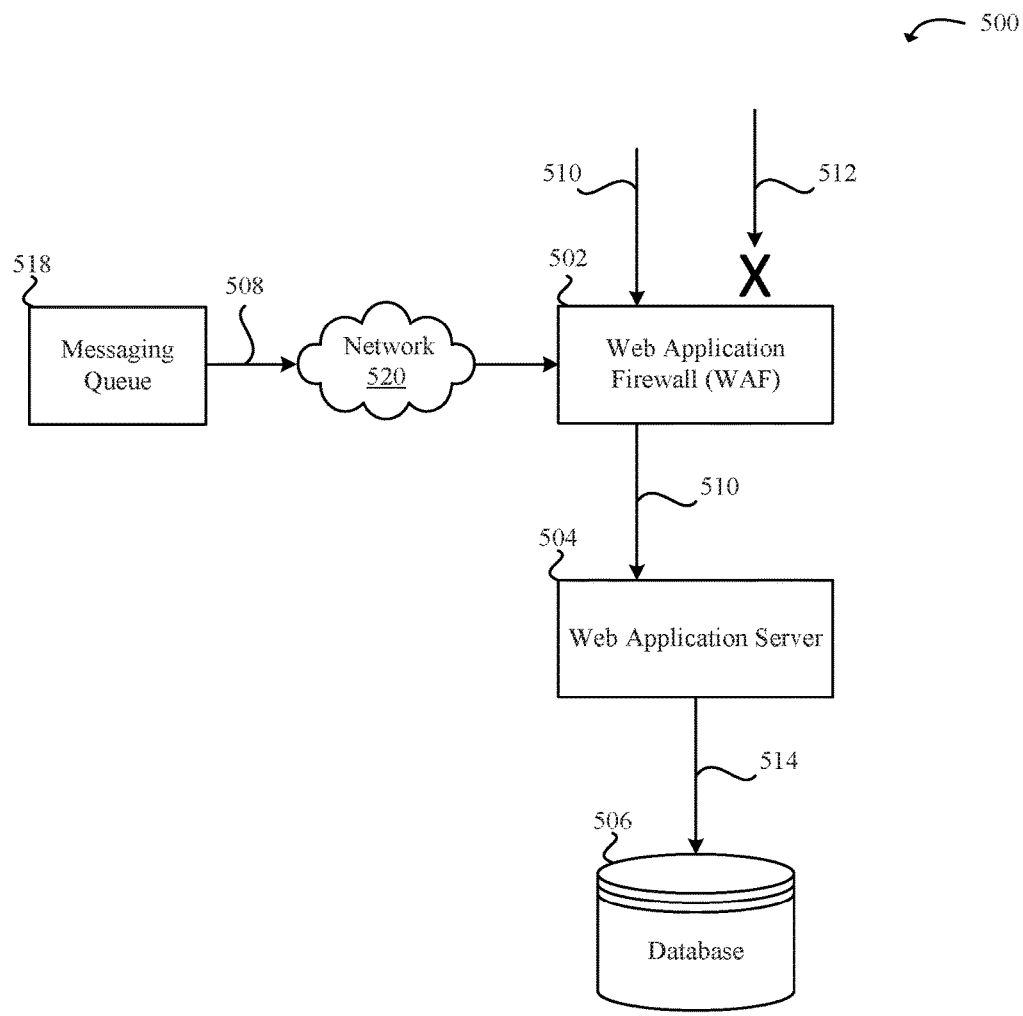
FIG. 5 illustrates an example of applying a threat neutralization strategy to a web application firewall (WAF).

FIG. 5 illustrates an example 500 of applying a threat neutralization strategy 508 to a web application firewall (WAF) 502. As indicated by an arrow, the threat neutralization strategy 508 may be received by the WAF 502 via a computer network 520 (e.g., the Internet or a private computer network) from a messaging queue 518 or messaging engine, for instance. The threat neutralization strategy 508 may be to block: a particular IP address, certain types of traffic, a certain sequence of packets or specific types of commands or procedures sent over the network (e.g., SQL injection). Thus, in applying the threat neutralization strategy 508, the WAF 502 may continue to allow a valid connection 510 through the WAF to the web application server 504 while an invalid connection 512 may be blocked from reaching the web application server 504.

A WAF may be a type of network-based application layer firewall operating at the application layer of a protocol stack such as IP. Such as security scheme is sometimes known as a proxy-based or reverse-proxy firewall. A WAF may be implemented through software running on a computer host or through a stand-alone piece of network hardware. Often, a WAF may be a computer hosting using various forms of proxy servers to proxy traffic before passing the traffic on to a client or server computer. Because a WAF acts on the application layer, a WAF may inspect the contents of traffic and block specified content, such as certain websites, viruses, or attempts to exploit known logical flaws in server software.

Some other types of modern application firewalls may also offload encryption from servers, block application input and output from detected intrusions or block malformed communication, manage or consolidate authentication, or block content which violates policies regarding a specific application. Further, a WAF may include a set of rules that may configure the WAF to selectively allow or deny network traffic. Rules on a WAF may generally be designed to filter hypertext transfer protocol (HTTP) traffic.

A structure query language (SQL) injection attack 514 may sometimes be executed against unprotected web servers. SQL may be used to query a database 506 serving the web application server 504, for instance. An attacker may launch a series of probes or scans against a web server to test for any known SQL injection weakness. For instance, an attacker may send various intentionally malformed input data to the server and review error responses from the web application. Certain error responses may indicate vulnerabilities, while error responses may reveal information to further refine the attack. Thus, a WAF can protect against such attacks. In the present technology, the WAF can detect such attacks and report the attack so that attach may be communicated over to trusted technology partners of the organization which owns the WAF.

The technology may include generating a threat neutralization strategy in response to the computer security threat and applying the threat neutralization strategy to at least one computer in a computer network managed by the trusted security partner. Publication of the computer security threat, generation of the threat neutralization strategy, and application of the threat neutralization strategy may be performed without human intervention. For example, certain types of attacks or combinations of attacks may be fed to a machine learning module which has been trained in advance. The machine learning module may evaluate the attacks using regression analysis, a Bayesian filter or another machine learning method. Thus, the features of the attacks can be used to determine the countermeasure that should be taken. Machine learning may even assist with determining which trusted security partners to send the attack information by evaluating the threat levels (e.g., seriousness) of an attack with respect to the security level or security weighting of the trusted security partners. Thus, according to the technology, threat neutralization strategies may be applied to WAFs without necessarily involving IT personnel, for example.

In one example configuration, a decentralized web of trust can be used as a vetting process for allowing trusted security partners to be connected together. A web of trust is a policy tool that works by calculating the strength of certifications made about a particular public key in a certificate owned by a first user, by using endorsements made by a second user with a trusted key controlled by the second user. The certificates can be digitally signed by other users who, by that act, endorse the association of that public key with the user or entity listed in the original certificate. This endorsement may occur at key signing parties. A user may specify how much the user trusts another key in order to introduce new keys to the user's key ring. For example, a decentralized web of trust from the perspective of the first user node trusts various keys and other users to sign or vouch for legitimacy of other users' keys. As a result, various levels of trust may be set. Accordingly, the web of trust provides a vetting process that allows a user to calculate a threshold, or multiple levels of thresholds, which tell an end user whether or not to trust the authenticity of another user in the web of trust. The disclosed technology may use a web of trust vetting process to securely connect to trusted security partners in a partner network graph with some assurance that the partner organization is truly the organization they claim to be.

In an additional configuration, public key infrastructure (PKI) may often establish trust directly or through vertical hierarchal trust and/or horizontal cross-certification. PKI is generally an arrangement that binds public keys with respective user identities by means of a certificate authority (CA). The user identity must be unique within each CA domain, and a third-party validation authority (VA) may be able to provide this information on behalf of CA. The binding is established through the registration and issuance process, which, depending on the assurance level of the binding, may be carried out by software at a CA or under human supervision. The PKI role that assures this binding is generally referred to as the registration authority (RA), which ensures that the public key is bound to the individual to whom it is assigned in a way that ensures non-repudiation. The disclosed technology may use PKI or a web of trust vetting process to connect to trusted security partners in a partner network graph. Additionally, partner organization priority or weighting may be used as a means to increase the trustworthiness of an organization in the web of trust.

Tokens may also be used or exchanged between security partners in order to form trust between potential trusted security partners. These tokens may be issued from a centralized authority, such as an automated, centralized token server that is already trusted or the tokens may be validated in a decentralized manner.

Figure 6:
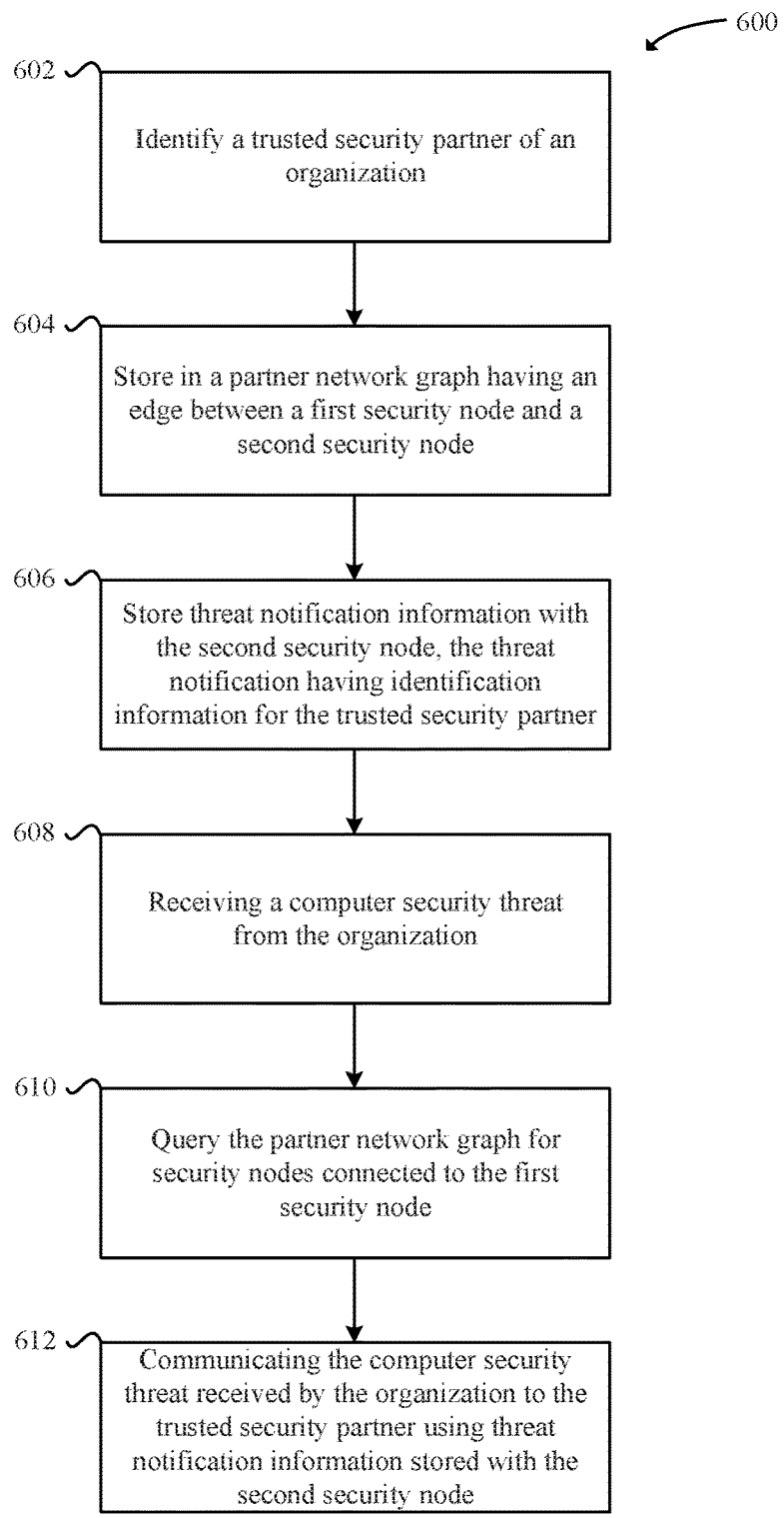
FIGS. 6-7 are flowcharts illustrating example methods for sharing computer security threats.
Figure 7:
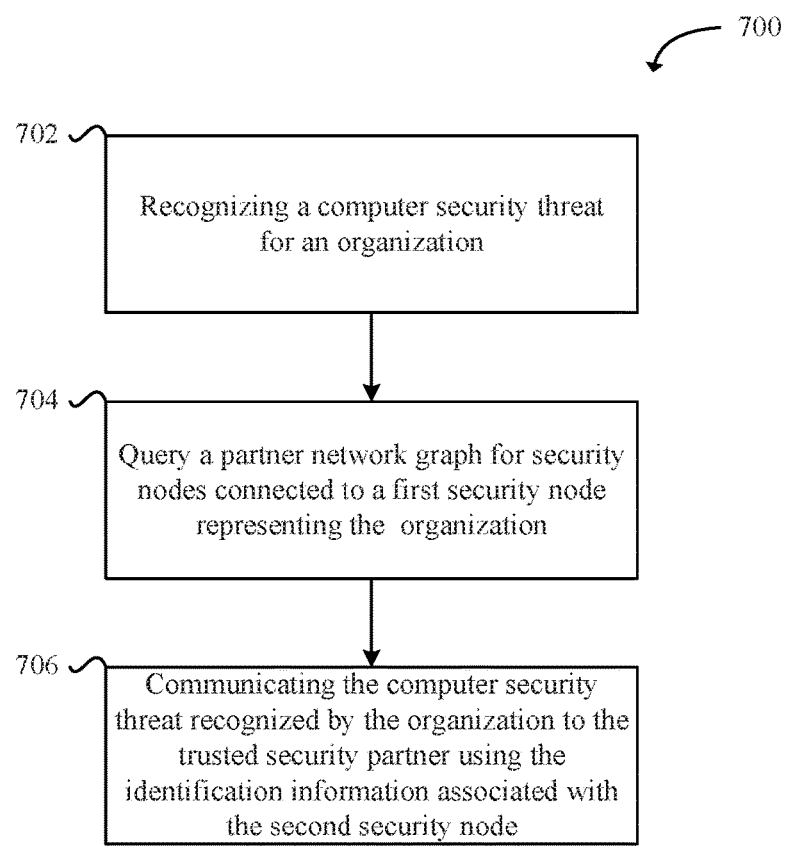

FIGS. 6-7 illustrate flow diagrams of methods according to the present technology. For simplicity of explanation, the methods are depicted and described as a series of acts. However, acts in accordance with this disclosure can occur in various orders and/or concurrently, and with other acts not presented and described herein. Furthermore, not all illustrated acts may be included in implementations of the methods in accordance with the disclosed subject matter. In addition, those skilled in the art will understand and appreciate that the methods could alternatively be represented as a series of interrelated states via a state diagram or events.

FIG. 6 is a flowchart illustrating an example of a method 600 for sharing computer security threats. The method 600 may include identifying a trusted security partner of an organization using a trusted security service, as shown in method element 602. A further operation may be storing a partner network graph having an edge between a first security node and a second security node in the trusted security service, the first security node representing the organization, the second security node indicating the trusted security partner, as shown in method element 604.

A user interface portal may allow trusted security partners of an organization to be identified. The edges in the partner network graph may include related information such as edge weight or edge direction. Edge weight may indicate a security tier of a trusted security partner. A trusted security partner with a heavily weighted edge may indicate that the trusted security partner should receive a higher notification priority when a computer security threat is detected by the organization. Additionally, a higher tier may allow the trusted security partner to receive a more substantial portion of the computer security threats detected by the organization.

Additionally, the method 600 may include storing threat notification information with the second security node in the trusted security service, the threat notification having identification information for the trusted security partner, as shown in method element 606. Threat notification information may include electronic formatting information, what types of computer security threats may be requested by a trusted security partner and may include accounting information to ensure that the organization and the trusted security partner are both benefiting from the security partnership. The method 600 may further include receiving a computer security threat at the trusted security service from organization, as shown in method element 608. As an example, a WAF appliance at a first company may detect an authentication threat and may communicate the computer security threat using the system. Included in the computer security threat may be a source IP address, port, a source software package, or a threat type.

The method 600 may further include querying the partner network graph in the trusted security service for security nodes connected to the first security node, thereby returning the second security node identifying the trusted security partner of the organization, as shown in method element 610, and communicating the computer security threat received by the organization to the trusted security partner using threat notification information stored with the second security node, as shown in method element 612. The publication may occur by sending the thread notification directly to the trusted security partner using an addressed communication. or alternatively, the threat information may be placed in a secure landing place such as an FTP (File Transfer Protocol) site or secure web feed for the trusted security partner to download. Identification information associated with the security node identifying the trusted security partner may be retrieved with the query and the computer security threat may be communicated to the trusted security partner through a message queue. Based in part on a security tier associated with a security node a first security node may determine whether to communicate a particular computer security threat to a trusted security partner. Organizations that have more similar security postures, may for example, be more inclined to share more computer security threat information, whereas organizations with very different security postures may desire to have a more limited arrangement in sharing computer security threats. As another example, a higher tiered trusted security partner may be messaged about the computer security threat more quickly than a lower tiered trusted security partner. Using this scheme, the technology may allow preferential treatment of trusted security partners based on the partner network graph. As a further example, a higher tiered trusted security partner may be messaged about more types of computer security threats than a lower tiered trusted security partner.

FIG. 7 is a flowchart illustrating an example of a method 700 for sharing computer security threats. The method 700 may include recognizing a computer security threat at an organization, as shown in method element 702. The method 700 may also include querying a partner network graph for security nodes connected to a first security node representing the organization, the first security node being connected to at least a second security node representing a trusted security partner of the organization, the second security node being associated with identification information, as shown in method element 704. The method 700 may further include communicating the computer security threat recognized by the organization to the trusted security partner using the identification information associated with the second security node, as shown in method element 706.

Figure 8:
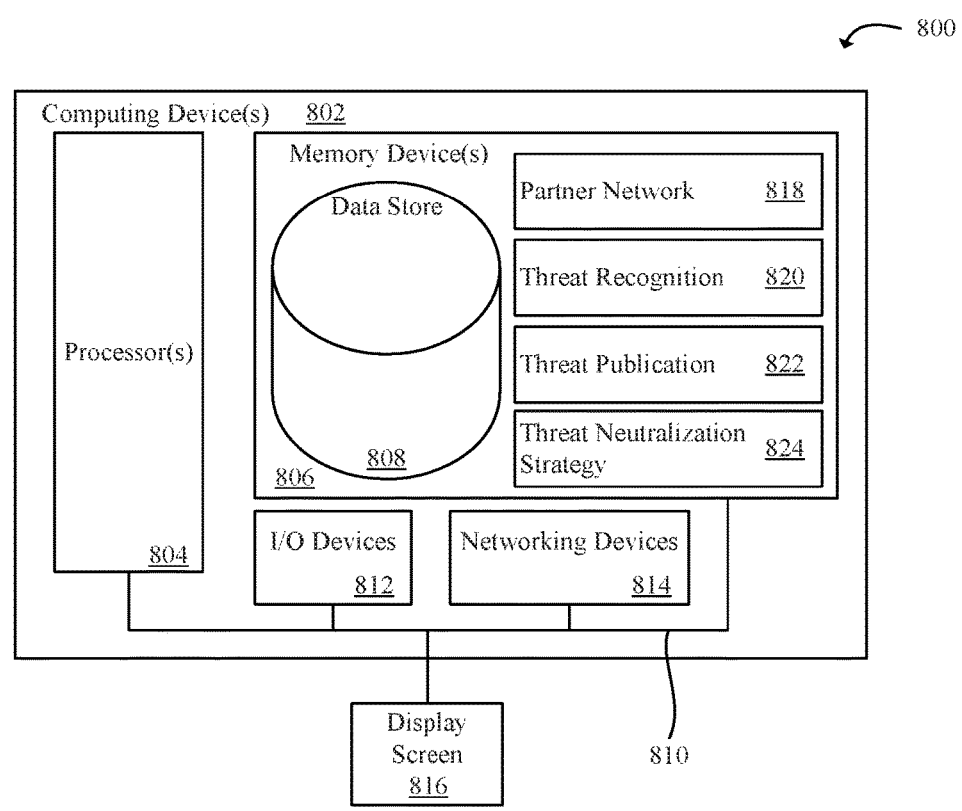
FIG. 8 is block diagram illustrating an example of a computing device that may be used for sharing computer security threats.

FIG. 8 is block diagram illustrating an example of a computing device that may be used for sharing computer security threats. In particular, the computing device 802 illustrates a high level example of a device on which modules of the disclosed technology may be executed. The computing device 802 may include one or more processors 804 that are in communication with memory devices 806. The computing device 802 may include a local communication interface 810 for the components in the computing device. For example, the local communication interface 810 may be a local data bus and/or any related address or control busses as may be desired.

The computing device 802, for instance, may be used in analog streaming. In particular, the memory device 806 may contain modules that are executable by the processor(s) 804 and data for the modules. Located in the memory device 806 are modules executable by the processor. For example, a partner network module 818, a threat recognition module 820, a threat publication module 822, threat neutralization strategy module 824 and other modules may be located in the memory device 806. The modules may execute the functions described earlier.

A data store 808 may also be located in the memory device 806 for storing data related to the modules and other applications along with an operating system that is executable by the processor(s) 804.

Other applications may also be stored in the memory device 806 and may be executable by the processor(s) 804. Components or modules discussed in this description that may be implemented in the form of software using high programming level languages that are compiled, interpreted or executed using a hybrid of the methods.

The computing device may also have access to I/O (input/output) devices 812 that are usable by the computing devices. An example of an I/O device is a display screen 816 that is available to display output from the computing devices. Other known I/O devices may be used with the computing device as desired. Networking devices 814 and similar communication devices may be included in the computing device. The networking devices 814 may be wired or wireless networking devices that connect to the internet, a LAN, WAN, or other computing network.

The components or modules that are shown as being stored in the memory device 806 may be executed by the processor(s) 804. The term "executable" may mean a program file that is in a form that may be executed by a processor 804. For example, a program in a higher level language may be compiled into machine code in a format that may be loaded into a random access portion of the memory device 806 and executed by the processor 804, or source code may be loaded by another executable program and interpreted to generate instructions in a random access portion of the memory to be executed by a processor. The executable program may be stored in any portion or component of the memory device 806. For example, the memory device 806 may be random access memory (RAM), read only memory (ROM), flash memory, a solid state drive, memory card, a hard drive, optical disk, floppy disk, magnetic tape, or any other memory components.

The processor 804 may represent multiple processors and the memory device 806 may represent multiple memory units that operate in parallel to the processing circuits. This may provide parallel processing channels for the processes and data in the system. The local communication interface 810 may be used as a network to facilitate communication between any of the multiple processors and multiple memories. The local communication interface 810 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A non-transitory computer-readable medium storing a program causing a computer to perform a method to share computer security threats, the method comprising:
   identifying a trusted security partner of an organization using a trusted security service;
   storing a partner network graph having an edge weight between a first security node and a second security node in the trusted security service, the first security node representing the organization, the second security node representing the trusted security partner, wherein the edge weight represents a security tier of the trusted security partner;
   storing threat notification information, including information regarding types of computer security threats requested by the trusted security partner, with the second security node in the trusted security service, the threat notification having identification information for the trusted security partner;
   receiving computer security threat information from the organization; and
   communicating the computer security threat information received from the organization to the trusted security partner via the trusted security service using identification information stored with the second security node, wherein an amount of the security threat information sent to the trusted security partner is based on the edge weight of the trusted security partner.

2. The non-transitory computer-readable medium of claim 1, wherein the edge between the organization and the trusted security partner is stored as a directed edge to control computer security threat publication flow.

3. The non-transitory computer-readable medium of claim 1, the method further comprising:
   querying the partner network graph in the trusted security service for security nodes connected to the first security node, thereby identifying the second security node representing the trusted security partner of the organization;
   generating a threat neutralization strategy in response to receiving communication of the computer security threat; and
   applying the threat neutralization strategy to at least one computer in a computer network managed by the trusted security partner.

4. A computer implemented method, comprising:
   under control of one or more computer systems configured with executable instructions:
   recognizing a computer security threat for an organization;
   querying a partner network graph for security nodes connected to a first security node corresponding to the organization, the first security node being connected to at least a second security node corresponding to a trusted security partner of the organization, the second security node being associated with identification information, the second security node further stores threat information regarding types of computer security threats requested by the trusted security partner, and upon a query, the partner network graph identifies a security clearance of the trusted security partner; and
   communicating the computer security threat recognized by the organization to the trusted security partner using the identification information and the threat information associated with the second security node, wherein an amount of information regarding the security threat and the threat information associated with the second node sent to the trusted security partner is based on an edge weight and the security clearance of the trusted security partner.

5. The method of claim 4, wherein the partner network graph is located on a trusted security service and the computer security threat is communicated to trusted security partners using the trusted security service.

6. The method of claim 4, wherein the connection between the first security node and the second security node is automatically made because the first security node and the second security node are certified by a shared security authority in the partner network graph.

7. The method of claim 4, further comprising determining whether to communicate the computer security threat to the trusted security partner based in part on a security tier associated with the second security node.

8. The method of claim 4, wherein the identification information includes at least one of an Internet protocol (IP) address, an Internet domain name, an email address, a short message service (SMS) number, or a uniform resource locator (URL).

9. The method of claim 4, wherein communicating the computer security threat includes transmitting at least one of the following for the computer security threat using the identification information: a source Internet protocol (IP) address, a source software package, or a threat type.

10. The method of claim 4, further comprising:
    generating a threat neutralization strategy in response to the computer security threat; and
    applying the threat neutralization strategy to a computer in a computer network, wherein publication of the computer security threat, generation of the threat neutralization strategy, and application of the threat neutralization strategy are performed without human intervention.

11. The method of claim 10, wherein the computer is a web application firewall (WAF).

12. The method of claim 4, further comprising:
outputting the computer security threat for review by a person; and
receiving a threat neutralization strategy in response to the computer security threat through a user interface (UI).

13. The method of claim 12, further comprising:
outputting the threat neutralization strategy for review by a person;
receiving approval to apply the threat neutralization strategy through a user interface (UI); and
applying the threat neutralization strategy to at least one computer in a computer network managed by the trusted security partner.

14. The method of claim 4, further comprising identifying the trusted security partner of the organization using a public-key infrastructure (PKI).

15. A system, comprising:
a processor;
a memory device including instructions, that when executed by the processor, cause the system to:
 maintain, at a trusted security service, a partner network graph having security nodes including identification information, which includes threat information regarding types of computer security threats requested by a trusted security partner and the identification information includes an edge direction that indicates whether the threat information flows in two directions between the trusted security partner and another node;
 register trusted security partnerships between security nodes in the partner network graph in the trusted security service;
 receive a computer security threat from a computer associated with a security node in the partner network graph in the trusted security service; and
 communicating the computer security threat to a trusted security partner based on the computer security threat matching a type of computer security threat included in the threat information, wherein an amount of the threat information sent to the trusted security partner is based on an edge weight of the trusted security partner.

16. The system of claim 15, further comprising instructions to identify trusted security partnerships with a decentralized web of trust vetting process.

17. The system of claim 15, further comprising instructions to:
communicate the computer security threat to the trusted security partner associated with the security node in the partner network graph of the trusted security service; and
recommend trusted security partnerships for the security node in the partner network graph based in part on shared connections of a first security node and a second security node.

18. The system of claim 15, wherein the partner network graph includes weighted edges indicating relationship tiers.

19. The system of claim 18, wherein trusted security partners associated with the security node in the partner network graph are communicated about the computer security threat after a period of time that is set based in part on a weighting for an edge that is connecting the trusted security partner to the security node.

20. The system of claim 18, wherein trusted security partners associated with the security node in the partner network graph are communicated about the computer security threat based in part on how heavily an edge is connecting the trusted security partner to the security node weighted security node and what type of computer security threat is potentially being messaged.

\* \* \* \* \*